US012244684B2

United States Patent
Jiang et al.

(10) Patent No.: US 12,244,684 B2
(45) Date of Patent: Mar. 4, 2025

(54) NETWORK SYNCHRONIZATION METHOD, APPARATUS, DEVICE, AND SYSTEM, AND READABLE STORAGE MEDIUM

(71) Applicant: Huawei Technologies Co., Ltd., Shenzhen (CN)

(72) Inventors: Yuanlong Jiang, Shenzhen (CN); Fanshun Meng, Wuhan (CN); Jingfei Lyu, Wuhan (CN); Jingfeng Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/317,697

(22) Filed: May 15, 2023

(65) Prior Publication Data

US 2023/0291537 A1 Sep. 14, 2023

Related U.S. Application Data

(63) Continuation of application No. PCT/CN2021/103822, filed on Jun. 30, 2021.

(30) Foreign Application Priority Data

Nov. 16, 2020 (CN) .......................... 202011275848.7
Feb. 4, 2021 (CN) .......................... 202110158060.6

(51) Int. Cl.
*H04L 7/00* (2006.01)
(52) U.S. Cl.
CPC ................................ *H04L 7/0087* (2013.01)

(58) Field of Classification Search
CPC ..... H04L 7/0087; H04J 3/0647; H04J 3/0667; H04J 2203/0085; H04J 3/1658
See application file for complete search history.

(56) References Cited

U.S. PATENT DOCUMENTS

| 2017/0093757 A1* | 3/2017 | Gareau | ................... H04J 3/065 |
| 2017/0171163 A1* | 6/2017 | Gareau | ................. H04L 9/0637 |

(Continued)

FOREIGN PATENT DOCUMENTS

| CN | 107800528 A | 3/2018 |
| CN | 108880722 A | 11/2018 |

(Continued)

OTHER PUBLICATIONS

IA #OIF et al: "IA OIF FLEXE-02.1 IA Flex Ethernet 2.1 Implementation Agreement", Jul. 1, 2019 (Jul. 1, 2019) XP055682222.

(Continued)

*Primary Examiner* — Benjamin M Thieu
(74) *Attorney, Agent, or Firm* — Slater Matsil, LLP

(57) ABSTRACT

A method includes: a first network device obtains a synchronization mode indication and synchronization information, where the synchronization mode indication indicates a target network device to perform synchronization based on the synchronization information. The first network device sends the synchronization mode indication and the synchronization information through a network that supports FlexE. A second network device receives the synchronization mode indication and the synchronization information through a network that supports FlexE. The second network device performs synchronization based on the synchronization mode indication and the synchronization information.

30 Claims, 6 Drawing Sheets

(56) References Cited

U.S. PATENT DOCUMENTS

| | | | | |
|---|---|---|---|---|
| 2018/0123714 A1* | 5/2018 | Zhong | ............... | H04L 1/0057 |
| 2019/0199505 A1* | 6/2019 | Zhang | ............... | H04L 7/0008 |
| 2020/0177361 A1* | 6/2020 | Gareau | ............... | H04L 7/0331 |
| 2022/0247505 A1* | 8/2022 | Li | ............... | H04W 56/001 |

FOREIGN PATENT DOCUMENTS

| | | | | |
|---|---|---|---|---|
| CN | 109428663 A | | 3/2019 | |
| CN | 109769223 A | | 5/2019 | |
| CN | 110971329 A | | 4/2020 | |
| EP | 3509245 A1 * | | 7/2019 | ............ H04J 3/065 |

OTHER PUBLICATIONS

ITU-T G.8023 Amd Characteristics of equipment functional blocks supporting Ethernet physical layer and Flex Ethernet interfaces, Sep. 2020, pp. 1-56.

Sean Liu Ciena Canada Canada: "Timing distribution over 6.8312 (exG.mtn) interfaces; C2004", ITU-T Draft; Study Period 2017-2020; Study Group 15; Series C2004, International Telecommunication Union, Geneva; CH, vol. 13/15; Aug. 25, 2020 (Aug. 25, 2020), pp. 1-3, XP044297654.

IEEE Standard for Ethernet, IEEE Computer Society, IEEE 802.3-2018, Sponsored by the LAN/MAN Standards Committee, Jun. 14, 2018, pp. 1-5600.

Bin Luo ZTE Corporation P R China: "FlexE synchronization functional models; WD13-52", ITU-T Draft; Study Period 2017-2020; Study Group 15; Series WD13-52, International Telecommunication Union, Geneva; CH, vol. 13/15; Mar. 6, 2019(Mar. 6, 2019), pp. 1-8, XP044260480.

ITU-T Recommendation G.7712 (Sep. 2010), "Architecture and specification of data communication network", including Amd1 (Oct. 2013) and Amd2 (Feb. 2016), pp. 1-96.

ITU-T G.8264/Y. 1364, Series G: Transmission Systems and Media, Digital Systems and Networks Packet over Transport aspects, Synchronization, quality and availability targets, Series Y: Global Information Infrastructure, Internet Protocol Aspects and Next-Generation Networks, Internet protocol aspects-Transport, "Distribution of timing information through packet networks", May 2014, 40 pages.

IEEE Std 1588-2008, IEEE Standard for a Precision Clock Synchronization Protocol for Networked Measurement and Control Systems, IEEE Instrumentation and Measurement Society, dated Jul. 24, 2008, total 289 pages.

* cited by examiner

NETWORK SYNCHRONIZATION METHOD, APPARATUS, DEVICE, AND SYSTEM, AND READABLE STORAGE MEDIUM

CROSS-REFERENCE TO RELATED APPLICATIONS

This application is a continuation of International Application No. PCT/CN2021/103822, filed on Jun. 30, 2021, which claims priority to Chinese Patent Application No. 202110158060.6, filed on Feb. 4, 2021 and Chinese Patent Application No. 202011275848.7, filed on Nov. 16, 2020. All of the aforementioned patent applications are hereby incorporated by reference in their entireties.

TECHNICAL FIELD

Embodiments of this disclosure relate to the field of communication technologies, and in particular, to a network synchronization method, apparatus, device, and system, and a readable storage medium.

BACKGROUND

The optical internetworking forum (OIF) initiates a flexible Ethernet (FlexE) protocol based on the Institute of Electrical and Electronics Engineers (IEEE) 802.3 protocol. Based on the FlexE protocol, an Ethernet interface rate can flexibly match various service scenarios.

SUMMARY

This disclosure provides a network synchronization method, apparatus, device, and system, and a readable storage medium, to simplify an operation process of network synchronization and improve network synchronization efficiency.

According to a first aspect, a network synchronization method is provided. The method is applied to a first network device that supports FlexE, and the method includes: A first network device obtains a synchronization mode indication and synchronization information, where the synchronization mode indication indicates a target network device to perform synchronization based on the synchronization information; and the first network device sends the synchronization mode indication and the synchronization information through a network that supports FlexE.

According to the method provided in embodiments of this disclosure, the synchronization mode indication that can indicate the target network device to perform synchronization based on the synchronization information is included, and can indicate which network devices among network devices supporting FlexE are target network devices to process synchronization information and a manner in which the network devices process the synchronization information, to implement automatic configuration of the network devices, simplify an operation process of configuring the network devices when network synchronization is required, and improve network synchronization efficiency.

In a possible implementation, the sending the synchronization mode indication and the synchronization information includes: sending a FlexE overhead frame, where the FlexE overhead frame includes the synchronization mode indication and the synchronization information. Because the FlexE overhead frame includes the synchronization mode indication and the synchronization information, the target network device can implement network synchronization based on the FlexE overhead frame without processing a service block.

In a possible implementation, the synchronization mode indication includes a first mode indication, and the first mode indication indicates the target network device to enter a FlexE synchronization mode. The first mode indication may be independent of an existing mode, or may be superimposed on the existing mode as an additional attribute, and a processing manner is flexible.

In a possible implementation, the method further includes: The first network device obtains target network device indication information, where the target network device indication information indicates that an other-end device of a FlexE section or an other-end device of a FlexE path is the target network device. The target network device is further indicated by the target network device indication information, and this can be implemented without occupying an additional resource. On the basis of indicating the target network device, resources are further saved.

In a possible implementation, the synchronization mode indication includes the target network device indication information.

In a possible implementation, the FlexE overhead frame includes at least one synchronization mode indication field, and the at least one synchronization mode indication field includes the synchronization mode indication; and the FlexE overhead frame includes a sixth FlexE overhead block, and the sixth FlexE overhead block includes the synchronization information.

In a possible implementation, a first synchronization mode indication field in the at least one synchronization mode indication field includes one or more bits, and the one or more bits include the synchronization mode indication; or the at least one synchronization mode indication field includes a second synchronization mode indication field, the second synchronization mode indication field includes at least one bit, and the at least one bit includes at least a part of the synchronization mode indication. Because the synchronization mode indication can be included in different cases of the synchronization mode indication field of the FlexE overhead frame, a manner of carrying the synchronization mode indication is more flexible.

In a possible implementation, that the sixth FlexE overhead block includes the synchronization information includes: encapsulating the synchronization information into an Ethernet frame, where the sixth FlexE overhead block includes the Ethernet frame.

In a possible implementation, that the sixth FlexE overhead block includes the Ethernet frame includes: dividing the Ethernet frame into N code blocks 1, 2, . . . , N−1, and N, and continuously inserting a first code block to an $i^{th}$ code block in the N code blocks into bit fields of a sixth FlexE overhead block of a first FlexE overhead frame, where N is a positive integer greater than or equal to 2, i is a positive integer greater than or equal to 1, and i is less than N; and continuously inserting an $(i+1)^{th}$ code block to a $j^{th}$ code block in the N code blocks into bit fields of a sixth FlexE overhead block of a second FlexE overhead frame, where the second FlexE overhead frame is a next FlexE overhead frame adjacent to the first FlexE overhead frame, j is a positive integer, and $i+1 \leq j \leq N$.

In a possible implementation, the synchronization information includes one or more of precision time protocol PTP information and a synchronous status message SSM, the PTP information indicates the target network device to perform time synchronization, and the synchronous status message indicates the target network device to perform frequency synchronization.

In a possible implementation, the first network device that supports flexible Ethernet FlexE includes a client edge device that supports FlexE or a node device in a network that supports FlexE, and the network that supports FlexE includes any one of a slicing packet network SPN, a metro transport network MTN, or an optical transport network OTN. The method can be applied to different networks that support FlexE, and disclosure scenarios are rich.

According to a second aspect, a network synchronization method is provided. The method is applied to a second network device that supports flexible Ethernet FlexE, and the method includes: The second network device receives a synchronization mode indication and synchronization information through a network that supports FlexE, where the synchronization mode indication indicates a target network device to perform synchronization based on the synchronization information; and the second network device performs synchronization based on the synchronization mode indication and the synchronization information.

In a possible implementation, the synchronization mode indication includes a first mode indication, and the first mode indication indicates the target network device to enter a FlexE synchronization mode; and that the second network device performs synchronization based on the synchronization mode indication and the synchronization information includes: The second network device enters the FlexE synchronization mode based on the first mode indication, and the second network device performs synchronization in the FlexE synchronization mode based on the synchronization information.

In a possible implementation, the method further includes: The second network device receives target network device indication information, where the target network device indication information indicates that an other-end device of a FlexE section or an other-end device of a FlexE path is the target network device.

In a possible implementation, the synchronization mode indication includes the target network device indication information.

In a possible implementation, the receiving a synchronization mode indication and synchronization information includes: receiving a FlexE overhead frame, where the FlexE overhead frame includes the synchronization mode indication and the synchronization information; and before that the second network device performs synchronization based on the synchronization mode indication and the synchronization information, the method further includes: The second network device parses the FlexE overhead frame, to obtain the synchronization mode indication and the synchronization information.

In a possible implementation, the synchronization information includes one or more of precision time protocol PIP information and a synchronous status message SSM; and that the second network device performs synchronization based on the synchronization information includes: if the synchronization information includes the PTP information, the second network device selects a time synchronization source based on the PTP information, and the second network device performs time synchronization based on the time synchronization source; or if the synchronization information includes the synchronous status message, the second network device selects a frequency synchronization source based on the synchronous status message, and the second network device performs frequency synchronization based on the frequency synchronization source.

In a possible implementation, the second network device that supports flexible Ethernet FlexE includes a client edge device that supports FexE or a node device in a network that supports FexE, and the network that supports FexE includes any one of a slicing packet network SPN, a metro transport network MTN, or an optical transport network OTN.

According to a third aspect, a network synchronization apparatus is provided. The apparatus is applied to a first network device that supports flexible Ethernet FexE, and the apparatus includes: an obtaining module, configured to obtain a synchronization mode indication and synchronization information, where the synchronization mode indication indicates a target network device to perform synchronization based on the synchronization information; and a sending module, configured to send the synchronization mode indication and the synchronization information through a network that supports FlexE.

In a possible implementation, the sending module is configured to send a FlexE overhead frame through a network that supports FlexE, where the FlexE overhead frame includes the synchronization mode indication and the synchronization information.

In a possible implementation, the synchronization mode indication includes a first mode indication, and the first mode indication indicates the target network device to enter a FlexE synchronization mode.

In a possible implementation, the obtaining module is further configured to obtain target network device indication information, where the target network device indication information indicates that an other-end device of a FlexE section or an other-end device of a FlexE path is the target network device.

In a possible implementation, the synchronization mode indication includes the target network device indication information.

In a possible implementation, the FlexE overhead frame includes at least one synchronization mode indication field, and the at least one synchronization mode indication field includes the synchronization mode indication; and the FlexE overhead frame includes a sixth FlexE overhead block, and the sixth FlexE overhead block includes the synchronization information.

In a possible implementation, a first synchronization mode indication field in the at least one synchronization mode indication field includes one or more bits, and the one or more bits include the synchronization mode indication; or the at least one synchronization mode indication field includes a second synchronization mode indication field, the second synchronization mode indication field includes at least one bit, and the at least one bit includes at least a part of the synchronization mode indication.

In a possible implementation, the apparatus further includes: an encapsulation module, configured to encapsulate the synchronization information into an Ethernet frame, where the sixth FlexE overhead block includes the Ethernet frame.

In a possible implementation, the encapsulation module is further configured to: divide the Ethernet frame into N code blocks 1, 2, . . . , N−1, and N, and continuously insert a first code block to an $i^{th}$ code block in the N code blocks into bit fields of a sixth FlexE overhead block of a first FlexE overhead frame, where N is a positive integer greater than or equal to 2, i is a positive integer greater than or equal to 1, and i is less than N; and continuously insert an $(i+1)^{th}$ code block to a $j^{th}$ code block in the N code blocks into bit fields of a sixth FlexE overhead block of a second FlexE overhead frame, where the second FlexE overhead frame is a next FlexE overhead frame adjacent to the first FlexE overhead frame, j is a positive integer, and i+1≤j≤N.

In a possible implementation, the synchronization information includes one or more of precision time protocol PIP information and a synchronous status message SSM, the PTP information indicates the target network device to perform time synchronization, and the synchronous status message indicates the target network device to perform frequency synchronization.

In a possible implementation, the first network device that supports flexible Ethernet FlexE includes a client edge device that supports FlexE or a node device in a network that supports FlexE, and the network that supports FlexE includes any one of a slicing packet network SPN, a metro transport network MTN, or an optical transport network OTN.

According to a fourth aspect, a network synchronization apparatus is provided. The apparatus is applied to a second network device that supports flexible Ethernet FlexE, and the apparatus includes: a receiving module, configured to receive a synchronization mode indication and synchronization information through a network that supports FlexE, where the synchronization mode indication indicates a target network device to perform synchronization based on the synchronization information; and a synchronization module, configured to perform synchronization based on the synchronization mode indication and the synchronization information.

In a possible implementation, the synchronization mode indication includes a first mode indication, and the first mode indication indicates the target network device to enter a FlexE synchronization mode; and the synchronization module is configured to enter the FlexE synchronization mode based on the first mode indication, and perform synchronization in the FlexE synchronization mode based on the synchronization information.

In a possible implementation, the receiving module is further configured to receive target network device indication information, where the target network device indication information indicates that an other-end device of a FlexE section or an other-end device of a FlexE path is the target network device.

In a possible implementation, the synchronization mode indication includes the target network device indication information.

In a possible implementation, the receiving module is configured to receive a FlexE overhead frame, where the FlexE overhead frame includes the synchronization mode indication and the synchronization information; and the apparatus further includes a parsing module, configured to parse the FlexE overhead frame, to obtain the synchronization mode indication and the synchronization information.

In a possible implementation, the synchronization information includes one or more of precision time protocol PIP information and a synchronous status message SSM; if the synchronization information includes the PIP information, the synchronization module is configured to select a time synchronization source based on the PIP information, and perform time synchronization based on the time synchronization source; or if the synchronization information includes the synchronous status message, the synchronization module is configured to select a frequency synchronization source based on the synchronous status message, and perform frequency synchronization based on the frequency synchronization source.

In a possible implementation, the second network device that supports flexible Ethernet FlexE includes a client edge device that supports FlexE or a node device in a network that supports FlexE, and the network that supports FlexE includes any one of a slicing packet network SPN, a metro transport network MTN, or an optical transport network OTN.

According to a fifth aspect, a network synchronization device is provided. The device includes a processor, the processor is coupled to a memory, the memory stores at least one program instruction or code, and the at least one program instruction or code is loaded and executed by the processor, so that the device implements the network synchronization method according to any one of the first aspect or the second aspect.

According to a sixth aspect, a network synchronization system is provided. The system includes: a first network device, configured to perform the method according to the first aspect or any one of the first aspect, and a second network device, configured to perform the method according to the second aspect or any one of the second aspect.

According to a seventh aspect, a computer-readable storage medium is provided. The computer-readable storage medium stores at least one program instruction or code, and when the program instruction or the code is loaded and executed by a processor, a computer is enabled to implement the network synchronization method according to any one of the first aspect or the second aspect.

Another communication apparatus is provided. The apparatus includes: a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the method in the first aspect or any possible implementation of the first aspect, or perform the method in the second aspect or any possible implementation of the second aspect.

In an example embodiment, there are one or more processors, and there are one or more memories.

In an example embodiment, the memory may be integrated with the processor, or the memory is disposed independently of the processor.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this disclosure.

A computer program (product) is provided. The computer program (product) includes computer program code. When the computer program code is run on a computer, the computer is enabled to perform the methods according to the foregoing aspects.

A chip is provided. The chip includes a processor, configured to: invoke, from a memory, instructions stored in the memory and run the instructions, so that a communication device on which the chip is installed performs the methods in the foregoing aspects.

Another chip is provided. The chip includes: an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

DETAILED DESCRIPTION OF ILLUSTRATIVE EMBODIMENTS

Terms used in an implementation part of this disclosure are merely used to explain embodiments of this disclosure, and are not intended to limit this disclosure. The following describes embodiments of the present invention with reference to accompanying drawings.

With diversification of Internet protocol (IP) network disclosures and services, there is a growing trend of increasing network traffic. Standard formulation and product development of Ethernet interfaces presents a ladder type. An Ethernet interface has a fixed rate, and there is a gap between the Ethernet interface rate and a transmission requirement. Therefore, the OIF develops a FlexE protocol based on the IEEE802.3 protocol, to meet a requirement for providing a higher bandwidth at a specific Ethernet interface rate level. The FlexE protocol defines a FlexE shim, so that an Ethernet interface rate can flexibly match a plurality of service scenarios. In addition, when a network processor (NP)/forwarding device with a higher bandwidth appears, performance of the device can be maximized without waiting for a new fixed-rate Ethernet standard to be released.

Figure 1:
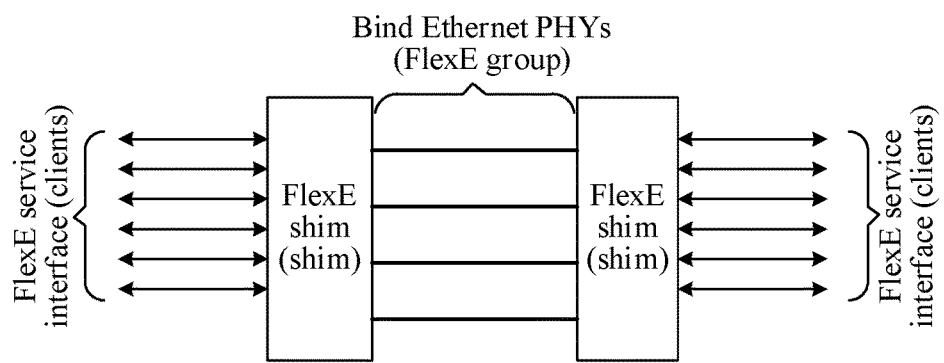
FIG. 1 is a schematic diagram of disclosure of a FlexE protocol according to an embodiment of this disclosure.

A basic function of the FlexE is to map, based on a time division multiplexing (TDM) mechanism of the FlexE shim, M FlexE client services to a flexible Ethernet group (FlexE group) including N physical layer PHY links, where both M and N are positive integers. For example, M is 6 and N is 4. A general architecture of the FlexE may be shown in FIG. 1. To be specific, in the FlexE shown in FIG. 1, six FlexE client services are mapped, based on the TDM mechanism of the FlexE shim, to a FlexE group including four physical layer (PHY) links.

Figure 2:
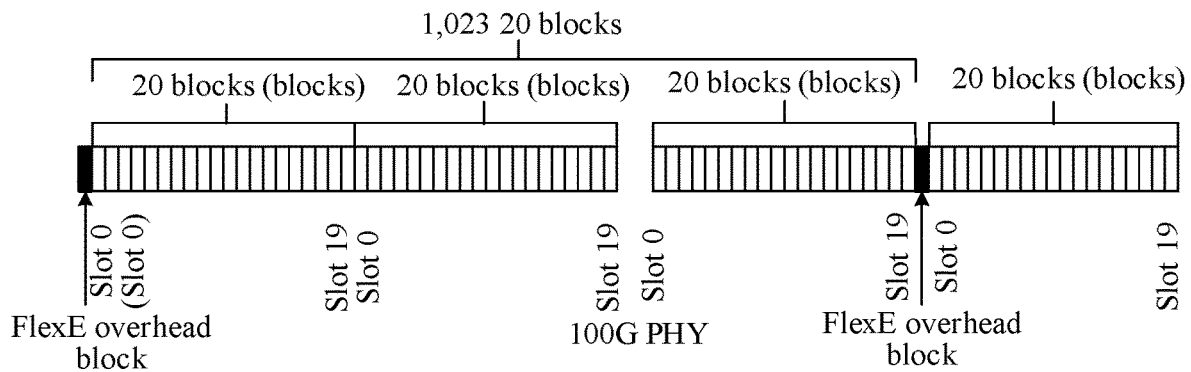
FIG. 2 is a schematic diagram of arrangement positions of FlexE overhead blocks and data blocks on a PHY according to an embodiment of this disclosure.

A 100-gigabit (G) PHY is used as an example. In the mapping mechanism of FlexE, each 100G PHY corresponds to slots corresponding to twenty 64B/66B code blocks, and each code block corresponds to a payload rate at a rate of 5 Gbit/s (bit/s, bps). A current FlexE standard supports FlexE on 100G, 200G, 400G, and 50G PHY interfaces. A slot periodicity format of data that passes through one 100G PHY is shown in FIG. 2. In FIG. 2, each block is a 64B/66B block encoded based on IEEE 802.3 clause 82, every 20 blocks form a calendar, and each block is a slot in the TDM mapping mechanism. After each calendar is repeated 1,023 times, a 64B/66B encoded FlexE overhead block is inserted. Every eight FlexE overhead blocks form one FlexE overhead frame, and every 32 FlexE overhead frames form one FlexE overhead multiframe. Client-slot mapping and various types of management of entire FlexE are implemented in overhead multiframes. Formats of a FlexE overhead frame and a FlexE overhead multiframe are shown in FIG. 3.

Figure 3:
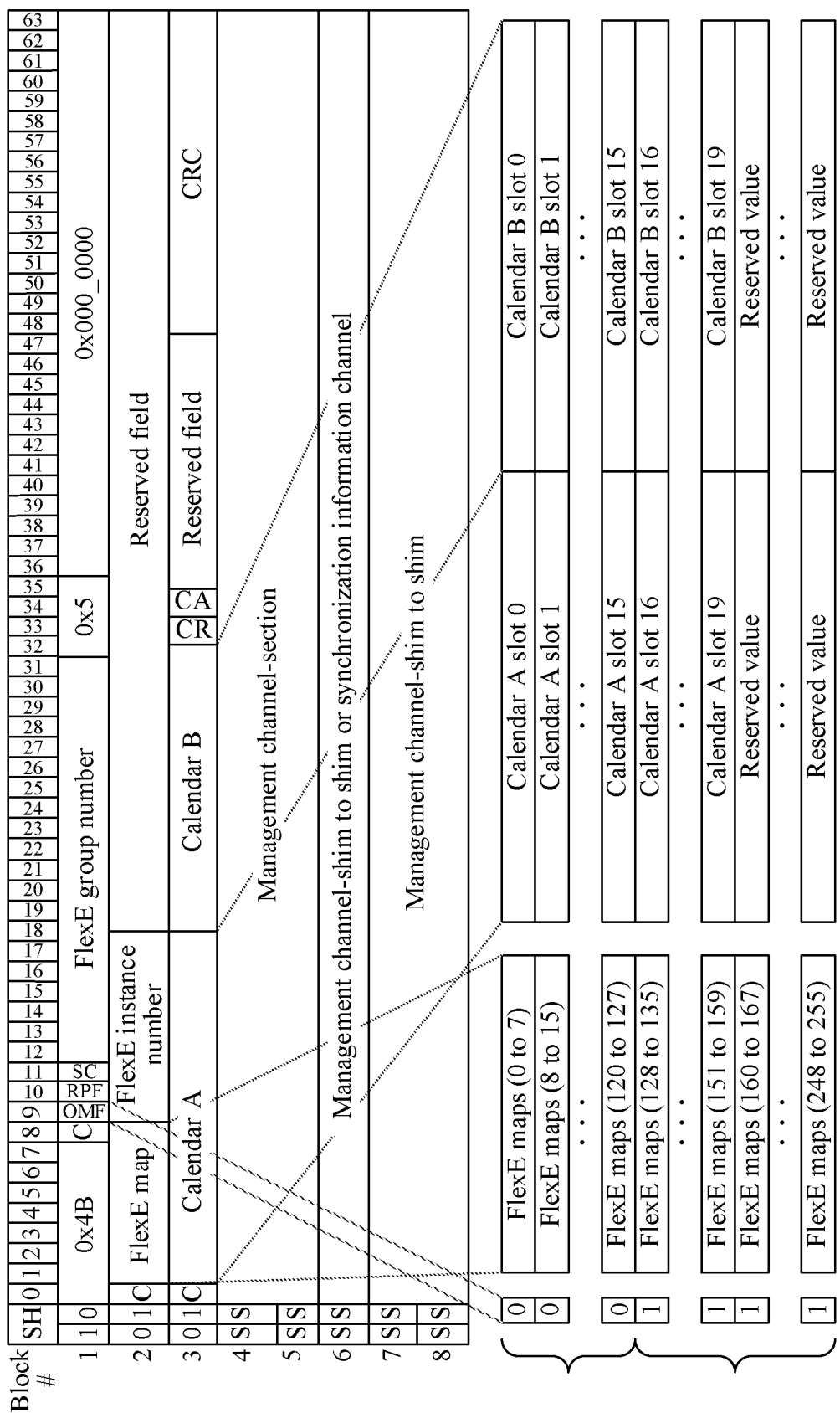
FIG. 3 is a schematic diagram of a structure of a FlexE overhead frame and a FlexE overhead multiframe according to an embodiment of this disclosure.

As shown in FIG. 3, a sixth FlexE overhead block of the FlexE overhead frame may be used as a management channel shim to shim, or may be used as a synchronization information channel. Synchronization control (SC) carried in an $11^{st}$ bit field of a first FlexE overhead block indicates that the sixth FlexE overhead block is used as the management channel or the synchronization information channel. For example, when the SC is 0, the sixth FlexE overhead block is used as the management channel; and when the SC is 1, the sixth FlexE overhead block is used as the synchronization information channel.

As shown in FIG. 3, in addition to information about the sixth FlexE overhead block and the SC, the FlexE overhead frame further includes the following information:

C: It indicates a calendar configuration in use. As shown in FIG. 3, an eighth bit field of the first FlexE overhead block, a $0^{th}$ bit field of a second FlexE overhead block, and a $0^{th}$ bit field of a third FlexE overhead block all carry the C.

Overhead multiframe indicator (OMFI): It is referred to as OMF in standards such as OIF-FlexE-01.0/01.1/02.2/02.1, where 01.0/01.1/02.2/02.1 are several versions of the OIF-FlexE standard and indicate a boundary of an overhead multiframe. A ninth bit field of the first FlexE overhead block shown in FIG. 3 carries the OMF. As shown in FIG. 3, in a FlexE overhead multiframe, OMF values of first 16 FlexE overhead frames are 0, and OMF values of last 16 FlexE overhead frames are 1. A boundary of the FlexE overhead multiframe can be determined through conversion between 0 and 1.

Remote PHY fault (RPF): It indicates a remote physical fault. A tenth bit field of the first FlexE overhead block shown in FIG. 3 carries the RPF.

Flexible Ethernet group number (FlexE group number): It identifies a flexible Ethernet group. A $12^{nd}$ bit field to a $31^{st}$ bit field of the first FlexE overhead block shown in FIG. 3 carry the FlexE group number.

Flexible Ethernet map (FlexE map): It is for controlling which FlexE instances are included in a FlexE group. A first bit field to an eighth bit field of the second FlexE overhead block shown in FIG. 3 carry the FlexE map. For example, the FlexE map includes information about FlexE instances in the FlexE group, each bit of the FlexE map corresponds to a FlexE instance, and a value of each bit of the FlexE map indicates whether a FlexE instance corresponding to the bit is in the FlexE group. For example, if a value of a bit is a first value, it is considered that a FlexE instance corresponding to the bit is in the FlexE group, and the first value may be 1; or if a value of a bit is a second value, it is considered that a FlexE instance corresponding to the bit is not in the FlexE group, and the second value may be 0.

Flexible Ethernet instance number (FlexE instance number): It indicates an identity of this FlexE instance within the group. A ninth bit field to a $16^{th}$ bit field of the second FlexE overhead block shown in FIG. 3 carry the FlexE instance number.

Calendar A and calendar B: The calendar A and the calendar B include calendar configuration information of all FlexE clients in a FlexE group, to avoid a traffic loss when the FlexE clients change a slot bandwidth configuration. Only one calendar is in a working state at any time. A first bit field to a $16^{th}$ bit field of the third FlexE overhead block shown in FIG. 3 carry the calendar A, and a $17^{th}$ bit field to a $32^{nd}$ bit field of the third FlexE overhead block carry the calendar B.

Calendar switch request (CSR): It is referred to as a CR in standards such as OIF-FlexE-01.0/01.1/02.2/02.1, and is for switching a calendar in which a multiplexing end and a demultiplexing end work during data transmission. A $33^{rd}$ bit field of the third FlexE overhead block shown in FIG. 3 carries the CR.

Calendar switch acknowledgment (CSA): It is referred to as CA in standards such as OIF-FlexE-01.0/01.1/02.2/02.1, and is for confirming that a demultiplexing end can switch a calendar. A $34^{th}$ bit field of the third FlexE overhead block shown in FIG. 3 carries the CA.

Synchronization header (SH): It is a frame header of a FlexE overhead frame, for example, the first two bits of the FlexE overhead block shown in FIG. 3.

Valid synchronization header bit (valid sync header bit, S): Fields under SHs in a fourth FlexE overhead block to an eighth FlexE overhead block shown in FIG. 3 carry the S.

Segment management channel (management channel-section): It carries segment management information. The fourth FlexE overhead block and the fifth FlexE overhead block shown in FIG. 3 carry the management channel.

Management channel-shim to shim: It carries management information shim to shim. When SC is 0, the sixth FlexE overhead block to the eighth FlexE overhead block shown in FIG. 3 carry the management channel. When SC is 1, the seventh FlexE overhead block and the eighth FlexE overhead block shown in FIG. 3 carry the management channel.

Cyclic redundancy check (CRC): It is for performing cyclic redundancy check protection on content of a FlexE overhead frame. A $48^{th}$ bit field to a $63^{rd}$ bit field of the third FlexE overhead block shown in FIG. 3 carry the CRC.

In addition to the fields including the foregoing information, the FlexE overhead frame further includes a reserved field. As shown in FIG. 3, a $17^{th}$ bit field to a $63^{rd}$ bit field of the second FlexE overhead block, and a $35^{th}$ bit field to a $47^{th}$ bit field of the third FlexE overhead block are all reserved fields.

An embodiment of this disclosure provides a network synchronization method. The method is applied to a network device that supports FlexE. According to the method, a synchronization mode indication that can indicate a target network device to perform synchronization based on synchronization information is carried, and can indicate which network devices among network devices supporting FlexE are target network devices to process synchronization information and a manner in which the network devices process the synchronization information, to implement automatic configuration of the network devices, simplify an operation process of configuring the network devices when network synchronization is required, and improve network synchronization efficiency.

Figure 4:
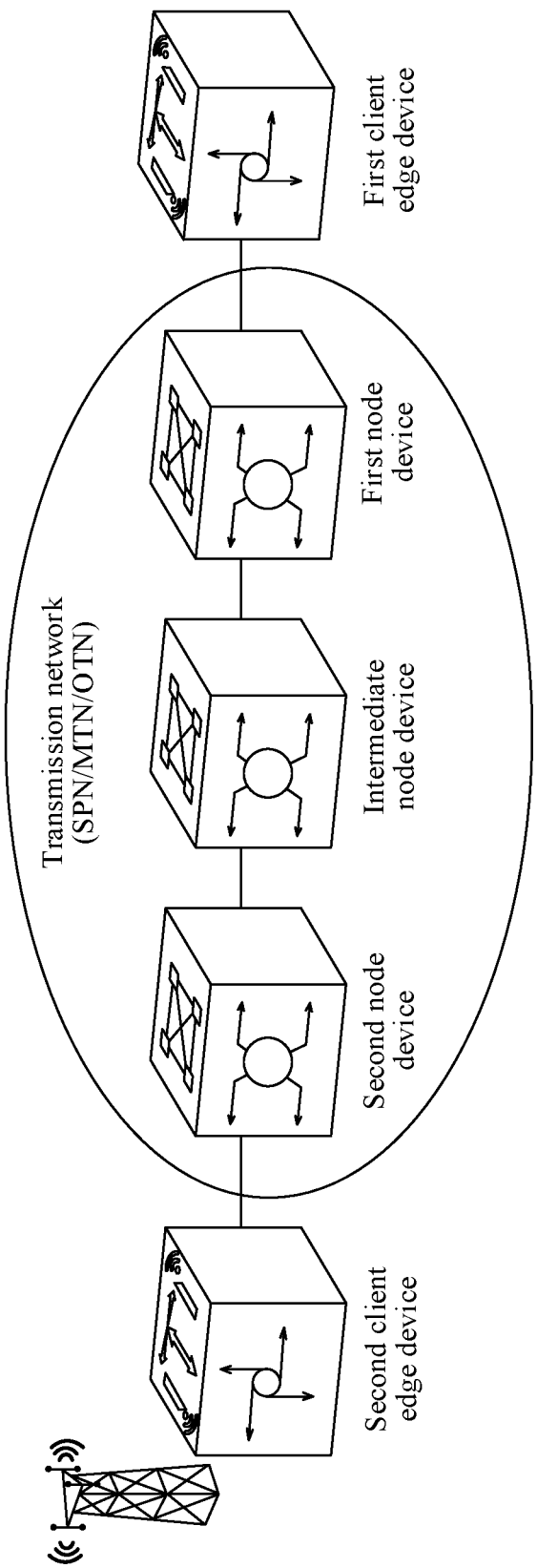
FIG. 4 is a schematic diagram of an implementation scenario of a network synchronization method according to an embodiment of this disclosure.

The method in this embodiment of this disclosure may be applied to an implementation scenario shown in FIG. 4. The implementation scenario includes client edge devices and provider edge devices (a first node device and a second node device) that support FlexE, and an intermediate node device in a network that supports FlexE synchronization, optical transport network (OTN) synchronization, or another synchronization manner. As shown in FIG. 4, both the first node device and the second node device are network node devices that support FlexE. The provider edge devices (the first node device and the second node device) can exchange information with the client edge devices through FlexE groups, and the provider edge devices can exchange synchronization information with the intermediate node device. For example, an operator network that supports FlexE access includes any one of a slicing packet network (SPN), a metro transport network (MTN), or an optical transport network (OTN).

Figure 5:
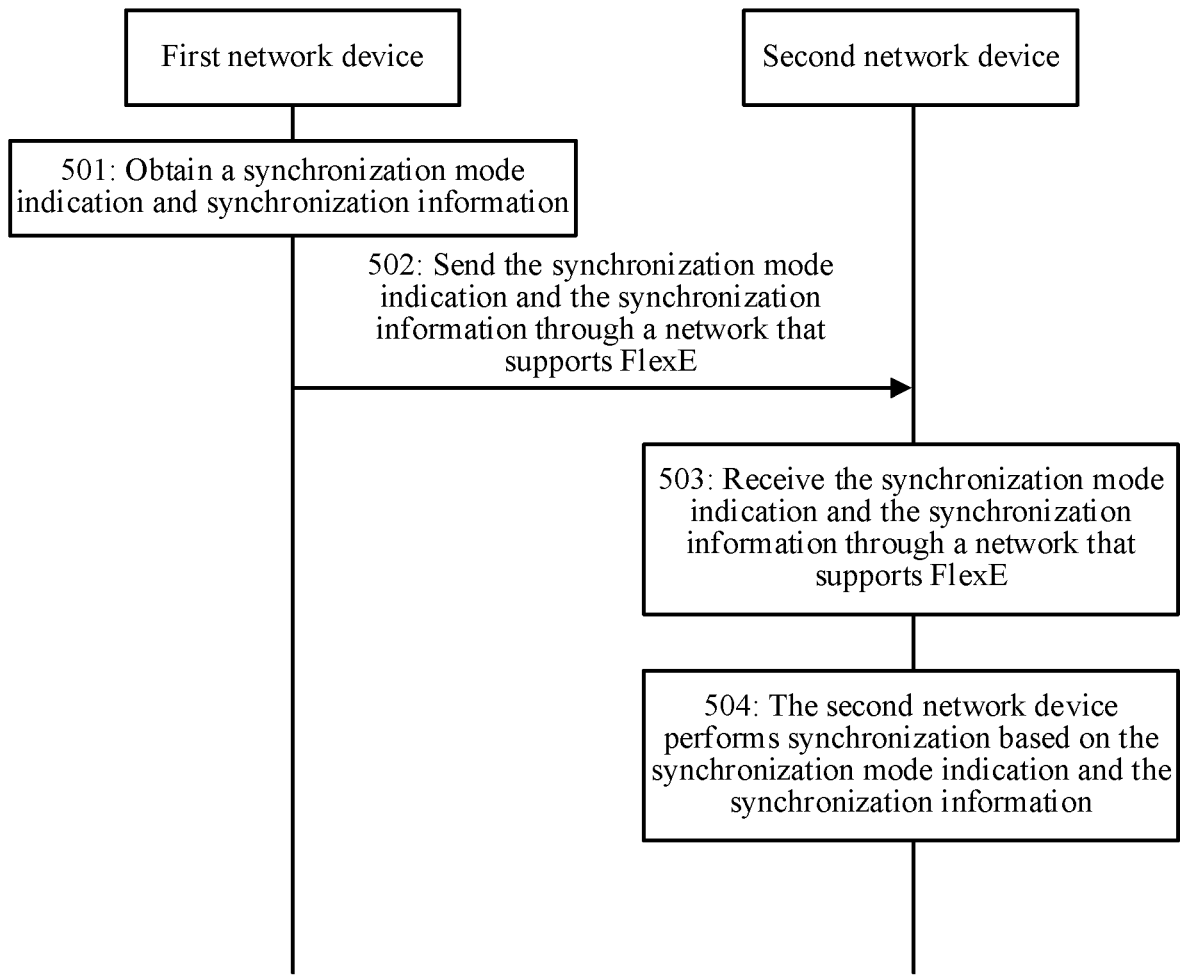
FIG. 5 is a flowchart of a network synchronization method according to an embodiment of this disclosure.

With reference to the implementation scenario shown in FIG. 4, the network synchronization method provided in this embodiment of this disclosure is shown in FIG. 5, and includes but is not limited to block 501 to block 504.

Block 501: A first network device obtains a synchronization mode indication and synchronization information.

The first network device includes a client edge device that supports FlexE, a provider edge device that supports FlexE (for example, the first node device), or an intermediate node device in a network that supports FlexE. Both the provider edge device that supports FlexE and the intermediate node device in the network that supports FlexE are node devices in the network that supports FlexE. The first network device obtains the synchronization mode indication and the synchronization information (for example, from a first client edge device) through FlexE. The synchronization mode indication indicates a target network device to perform synchronization based on the synchronization information, and the target network device is any network device.

In a possible implementation, the first network device obtains target network device indication information, where the target network device indication information indicates that an other-end device of a FlexE section or an other-end device of a FlexE path is a target network device. For example, the synchronization mode indication includes the target network device indication information. The target network device is further indicated by the target network device indication information, and this can be implemented without occupying an additional resource. On the basis of indicating the target network device, resources are further saved.

For example, the target network device indication information indicates, through an indicator bit, that the other-end device of the FlexE section or the other-end device of the FlexE path is the target network device. For example, the target network device indication information indicates, through a first indicator bit combination, that the other-end device of the FlexE section is the target network device. For example, the first indicator bit combination is a (0, 1), and the other-end device of the FlexE section is the first node device. The target network device indication information indicates, through a second indicator bit combination, that the other-end device of the FlexE path is the target network device. For example, the second indicator bit combination is (1, 0), and the other-end device of the FlexE path is the second node device. The target network device indication information indicates, through a third indicator bit combination, that no network device is the target network device. In other words, no network device enters a FlexE synchronization mode. For example, the third indicator bit combination is (0, 0). For example, the target network device indication information indicates, through an indicator bit, that a device in a specified FlexE section or a device corresponding to a specified FlexE path is a target network device. For example, the target network device indication information includes any one of a first indicator bit, a second indicator bit, and a third indicator bit. The target network device indication information indicates, through the first indicator bit, that a network device in the specified FlexE section is a target network device, indicates, through the second indicator bit, that any node device in the specified FlexE path is a target network device, and indicates, through the third indicator bit, that an end node device in the specified FlexE path is a target network device.

In a possible implementation, the synchronization mode indication includes a first mode indication, and the first mode indication indicates the target network device to enter a FlexE synchronization mode. In the FlexE synchronization mode, the target network device performs synchronization based on the synchronization information. It should be noted that, the first mode indication may be independent of an existing mode, or may be superimposed on the existing mode as an additional attribute, and a processing manner is flexible.

In a possible implementation, the FlexE overhead frame includes the synchronization mode indication and the synchronization information. Because the FlexE overhead frame includes the synchronization mode indication and the synchronization information, the target network device can implement network synchronization based on the FlexE overhead frame without processing a service block. For example, the FlexE overhead frame includes at least one synchronization mode indication field, and the at least one synchronization mode indication field includes the synchronization mode indication. Manners in which the at least one synchronization mode indication field of the FlexE overhead frame includes the synchronization mode indication include but are not limited to the following two manners.

Manner 1: A first synchronization mode indication field in the at least one synchronization mode indication field includes one or more bits, and the one or more bits include the synchronization mode indication.

In Manner 1, the synchronization mode indication may be entirely included in the first synchronization mode indication field, and the first synchronization mode indication field may be any synchronization mode indication field in the at least one synchronization mode indication field included in the FlexE overhead frame. For example, the FlexE overhead frame includes two synchronization mode indication fields: a synchronization mode indication field 1 and a synchronization mode indication field 2. The synchronization mode indication field 1 is a $17^{th}$ bit field to a $63^{rd}$ bit field of a second FlexE overhead block of the FlexE overhead frame, and the synchronization mode indication field 2 is a $35^{th}$ bit field to a $47^{th}$ bit field of a third FlexE overhead block of the FlexE overhead frame. For example, the synchronization mode indication field 1 may be used as the first synchronization mode indication field, and one or more bits of the synchronization mode indication field 1 are used to carry the synchronization mode indication. For another example, the synchronization mode indication field 2 may be used as the first synchronization mode indication field, and one or more bits of the synchronization mode indication field 2 are used to carry the synchronization mode indication.

Manner 2: At least one synchronization mode indication field includes a second synchronization mode indication field, the second synchronization mode indication field includes at least one bit, and the at least one bit includes at least a part of the synchronization mode indication.

In Manner 2, the synchronization mode indication is included in a plurality of second synchronization mode indication fields, at least one bit of each second synchronization mode indication field includes at least a part of the synchronization mode indication, and at least two synchronization mode indication fields in the at least one synchronization mode indication field included in the FlexE overhead frame are second synchronization mode indication fields. An example is still used in which the FlexE overhead frame includes two synchronization mode indication fields: a synchronization mode indication field 1 and a synchronization mode indication field 2, the synchronization mode indication field 1 is the $17^{th}$ bit field to the $63^{rd}$ bit field of the second FlexE overhead block of the FlexE overhead frame, and the synchronization mode indication field 2 is a $35^{th}$ bit field to a $47^{th}$ bit field of a third FlexE overhead block of the FlexE overhead frame. Both the synchronization mode indication field 1 and the synchronization mode indication field 2 are used as the second synchronization mode indication fields, and the synchronization mode indication field 1 and the synchronization mode indication field 2 each include a part of the synchronization mode indication. For example, the synchronization mode indication is 0100, two bits in the synchronization mode indication field 1 include 01, and two bits in the synchronization mode indication field 2 include 00. The synchronization mode indication is carried in the synchronization mode indication field 1 and the synchronization mode indication field 2.

In addition, in the foregoing example, only an example in which all synchronization mode indication fields included in the FlexE overhead frame are used as the second synchronization mode indication fields is used for description. In a possible implementation, some synchronization mode indication fields included in the FlexE overhead frame may alternatively be used as the second synchronization mode indication fields. In an implementation, a quantity of synchronization mode indication fields selected as the second synchronization mode indication fields and bits used in each second synchronization mode indication field to carry the synchronization mode indication are not limited in this embodiment of this disclosure, in addition, whether Manner 1 or Manner 2 is used is not limited in embodiments of this disclosure, and may be flexibly set based on a bit length in the synchronization mode indication and an disclosure scenario.

It should be noted that, in a possible implementation, the foregoing synchronization mode indication fields may be multiplexed on reserved fields of an existing FlexE overhead frame. For example, a plurality of reserved fields of the FlexE overhead frame shown in FIG. 3 are all used as synchronization mode indication fields.

Because the synchronization mode indication may be included in the synchronization mode indication field of the FlexE overhead frame in a plurality of manners, a manner of carrying the synchronization mode indication is more flexible.

For example, the FlexE overhead frame includes a sixth FlexE overhead block, and a manner in which the sixth FlexE overhead block includes the synchronization information includes: encapsulating the synchronization information into an Ethernet frame, where the sixth FlexE overhead block includes the Ethernet frame. The synchronization information includes, but is not limited to, one or more of precision time protocol (PTP) information and a synchronous status message (SSM). The PTP information indicates a target network device to perform time synchronization, and the synchronous status message indicates the target network device to perform frequency synchronization. For several cases of the synchronization information, the synchronization information included in the sixth FlexE overhead block includes but is not limited to the following three cases.

Case 1: The synchronization information includes the FTP information, and does not include the synchronous status message.

In a possible implementation, the first network device encapsulates the PTP information into the Ethernet frame based on an IEEE802.3 Ethernet encapsulation mechanism, divides the Ethernet frame into blocks, and inserts the blocks into the sixth FlexE overhead block of the FlexE overhead frame, so that the FlexE overhead frame includes the PTP information. For example, the first network device may further encapsulate the PTP information into a data packet based on an IP encapsulation mechanism, encapsulate the data packet into an Ethernet frame based on the IEEE802.3 Ethernet encapsulation mechanism, and insert the Ethernet frame into the sixth FlexE overhead block of the FlexE overhead frame, so that the FlexE overhead frame includes the PTP information.

Case 2: The synchronization information includes the synchronous status message, but does not include the PTP information.

In a possible implementation, the first network device encapsulates the synchronous status message into the Ethernet frame based on an IEEE802.3 Ethernet encapsulation mechanism, and inserts the Ethernet frame into the sixth FlexE overhead block of the FlexE overhead frame, so that the FlexE overhead frame includes the synchronous status message.

Case 3: The synchronization information includes the PTP information and the synchronous status message.

In a possible implementation, the first network device encapsulates the PTP information into a first Ethernet frame, encapsulates the synchronous status message into a second Ethernet frame, divides the first Ethernet frame and the second Ethernet frame into blocks, and inserts the blocks into the sixth FlexE overhead block of the FlexE overhead frame, so that the FlexE overhead frame includes the PTP information and the synchronous status message. A manner in which the first network device encapsulates the PTP information and the synchronous status message has the same principle as the encapsulation manner in Case 1 and Case 2, and details are not described herein again.

Regardless of the foregoing cases, a manner of inserting the encapsulated Ethernet frame into the sixth FlexE overhead block of the FlexE overhead frame includes but is not limited to: dividing the Ethernet frame into N code blocks 1, 2, . . . , N−1, and N, and continuously inserting a first code block to an $i^{th}$ code block in the N code blocks into bit fields of a sixth FlexE overhead block of a first FlexE overhead frame, where N is a positive integer greater than or equal to 2, i is a positive integer greater than or equal to 1, and i is less than N; and continuously inserting an $(i+1)^{th}$ code block to a $j^{th}$ code block in the N code blocks into bit fields of a sixth FlexE overhead block of a second FlexE overhead frame, where the second FlexE overhead frame is a next FlexE overhead frame adjacent to the first FlexE overhead frame, j is a positive integer, and i+1≤j≤N.

In addition to the manner in which the encapsulated Ethernet frame is divided into N code blocks and the N code blocks are respectively inserted into bit fields of sixth FlexE overhead blocks of different FlexE overhead frames, if bit fields of a sixth FlexE overhead block in a FlexE overhead frame are greater than a length of the N code blocks, the N code blocks may alternatively be all inserted into the bit fields of the sixth FlexE overhead block of the FlexE overhead frame. For example, regardless of whether the N code blocks are inserted into bit fields of a sixth FlexE overhead block in one FlexE overhead frame or inserted into bit fields of sixth FlexE overhead blocks of a plurality of FlexE overhead frames, if the N code blocks are not fully inserted into the bit fields of the sixth FlexE overhead block of the FlexE overhead frame, remaining bit fields of the sixth FlexE overhead block are set to a target reserved value. For example, the target reserved value is 0x00.

For example, when the synchronization information includes the PTP information and the synchronous status message, the first Ethernet frame into which the PTP information is encapsulated is divided into a plurality of first code blocks, and the second Ethernet frame into which the synchronous status message is encapsulated is divided into a plurality of second code blocks. A sequence of inserting the plurality of first code blocks and the plurality of second code blocks into the bit fields of the sixth FlexE overhead block of the FlexE overhead frame may be as follows: after all the plurality of first code blocks are inserted into the bit fields of the sixth FlexE overhead block of the FlexE overhead frame, inserting the plurality of second code blocks into the bit fields of the sixth FlexE overhead block of the FlexE overhead frame; or after all the plurality of second code blocks are inserted into the bit fields of the sixth FlexE overhead block of the FlexE overhead frame, inserting the plurality of first code blocks into the bit fields of the sixth FlexE overhead block of the FlexE overhead frame; or inserting the plurality of first code blocks and the plurality of second code blocks into the bit fields of the sixth FlexE overhead block of the FlexE overhead frame in a mixed manner.

Block 502: The first network device sends the synchronization mode indication and the synchronization information through a network that supports FlexE.

The first network device sends the synchronization mode indication and the synchronization information through the network that supports FlexE. In a possible implementation, the synchronization mode indication and the synchronization information are sent by the first network device through a FlexE group connected to the first network device. For example, the FlexE group connected to the first network device includes a plurality of PHYs, and the synchronization mode indication and the synchronization information may be sent by the first network device through at least one of the plurality of PHYs.

In a possible implementation, the first network device is a client edge device that supports FlexE. If a network that supports FlexE is any one of an SPN, an MTN, or an OTN, the first network device sends the synchronization mode indication and the synchronization information through a FlexE group connected to the first network device. The method can be applied to different networks that support FlexE, and disclosure scenarios are rich.

In a possible implementation, the first network device is a node device in a network that supports FlexE. If the network that supports FlexE is an SPN or an MTN, the first network device sends the synchronization mode indication and the synchronization information through a FlexE group connected to the first network device. If the network that supports FlexE is an OTN, the first network device sends the synchronization mode indication through a FlexE group connected to the first network device; and the first network device converts the synchronization information into OTN synchronization information, and sends the OTN synchronization information through a synchronization channel of the OTN.

The foregoing block 501 and block 502 are both processes of performing the network synchronization on the first network device side. The following describes a network synchronization method by using a second network device side as an example.

Block 503: The second network device receives a synchronization mode indication and synchronization information through a network that supports FlexE.

The second network device includes a client edge device that supports FlexE, a provider edge device that supports FlexE (for example, the second node device), or an intermediate node device in a network that supports FlexE. Both the provider edge device that supports FlexE and the intermediate node device in the network that supports FlexE are node devices in the network that supports FlexE. The synchronization mode indication indicates a target network device to perform synchronization based on the synchronization information, and the target network device is any network device. For example, the second network device receives, through a FlexE group, the synchronization mode indication and the synchronization information that are sent by the first network device.

Block 504: The second network device performs synchronization based on the synchronization mode indication and the synchronization information.

In a possible implementation, the synchronization mode indication includes a first mode indication, and the first mode indication indicates the target network device to enter a FlexE synchronization mode. In this embodiment, the second network device is the target network device, and that the second network device performs synchronization based on the synchronization mode indication and the synchronization information includes: The second network device enters the FlexE synchronization mode based on the first mode indication, and the second network device performs synchronization in the FlexE synchronization mode based on the synchronization information.

In a possible implementation, the second network device receives target network device indication information, where the target network device indication information indicates that an other-end device of a FlexE section or an other-end device of a FlexE path is a target network device. For example, the synchronization mode indication includes the target network device indication information. For example, the target network device indication information indicates, through an indicator bit, that the other-end device of the FlexE section or the other-end device of the FlexE path is the target network device. For example, the target network device indication information indicates, through a first indicator bit combination, that the other-end device of the FlexE section is the target network device. For example, the first indicator bit combination is a (0, 1). The target network device indication information indicates, through a second indicator bit combination, that the other-end device of the FlexE path is the target network device. For example, the second indicator bit combination is (1, 0). The target network device indication information indicates, through a third indicator bit combination, that no network device is the target network device. In other words, no network device enters a FlexE synchronization mode. For example, the third indicator bit combination is (0, 0).

If the target network device indication information includes the first indicator bit combination, it is clearly indicated that the other-end device of the FlexE section is the target network device. In other words, the other-end device of the FlexE section performs synchronization processing only after receiving the synchronization mode indication and the synchronization information, and a network device that is not the other-end device of the FlexE section does not perform synchronization processing even if receiving the synchronization mode indication and the synchronization information. A manner in which the indicated target network device and another network device other than the target network device respond to the received synchronization mode indication and synchronization information when the target network device indication information includes the second indicator bit combination or the third indicator bit combination is the same as a manner in which the indicated target network device and the another network device other than the target network device respond to the received synchronization mode indication and synchronization information when the target network device indication information includes the first indicator bit combination. Details are not described herein again.

In a possible implementation, the target network device indication information indicates, through an indicator bit, that a device in a FlexE section or a device corresponding to a FlexE path is a target network device. For example, the target network device indication information includes any one of a first indicator bit, a second indicator bit, and a third indicator bit. If the target network device indication information includes the first indicator bit, it is clearly indicated that a network device in a specified FlexE section is a target network device. In other words, the network device belonging to the specified FlexE section performs synchronization processing only after receiving the synchronization mode indication and the synchronization information, and a network device not belonging to the specified FlexE section does not perform synchronization processing even if receiving the synchronization mode indication and the synchronization information. If the target network device indication information includes the second indicator bit, it is clearly indicated that any node device in the specified FlexE path is a target network device. If the target network device indication information includes the third indicator bit, it is clearly indicated that an end node device in the specified FlexE path is a target network device. A manner in which the indicated target network device and another network device other than the target network device respond to the received synchronization mode indication and synchronization information when the target network device indication information includes any one of the first indicator bit, the second indicator bit, or the third indicator bit is the same as a manner in which the indicated target network device and the another network device other than the target network device respond to the received synchronization mode indication and synchronization information when the target network device indication information includes the first indicator bit combination. Details are not described herein again.

In an example in which the target network device indication information includes the first indicator bit combination, if the second network device is the other-end device of the FlexE section, the second network device enters a FlexE synchronization mode based on the target network device indication information, and the second network device performs synchronization in the FlexE synchronization mode based on the synchronization information; or if the second network device is not the other-end device of the FlexE section, the second network device does not enter the FlexE synchronization mode based on the target network device indication information, and the second network device does not perform synchronization based on the synchronization information.

When the second network device performs synchronization based on the synchronization information, for several cases of the synchronization information, the process includes but is not limited to the following three cases.

Case 1: The synchronization information includes the PTP information, and does not include the synchronous status message SSM.

For case 1, the second network device selects a time synchronization source based on the PTP information, and performs time synchronization based on the selected time synchronization source.

In a possible implementation, the second network device decapsulates the PTP information included in the FlexE overhead frame based on an IEEE802.3 Ethernet decapsulation mechanism to obtain the PTP information, selects the time synchronization source based on the obtained PTP information, and performs time synchronization based on the selected time synchronization source. For example, if the second network device decapsulates the PTP information included in the FlexE overhead frame based on the IEEE802.3 Ethernet decapsulation mechanism to obtain a data packet encapsulated based on the IP encapsulation mechanism, the second network device further decapsulates the data packet based on the IP decapsulation mechanism to obtain the PTP information.

Case 2: The synchronization information includes the synchronous status message SSM, and does not include the PTP information.

For case 2, the second network device selects a frequency synchronization source based on the synchronous status message, and performs frequency synchronization based on the selected frequency synchronization source.

In a possible implementation, the second network device decapsulates the synchronous status message included in the FlexE overhead frame based on the IEEE802.3 Ethernet decapsulation mechanism to obtain the synchronous status message, selects the frequency synchronization source based on the obtained synchronous status message, and performs frequency synchronization based on the selected frequency synchronization source.

Case 3: The synchronization information includes the PTP information and the synchronous status message SSM.

For case 3, the second network device selects a time synchronization source based on the PTP information, and performs time synchronization based on the selected time synchronization source. Optionally, the second network device selects a frequency synchronization source based on the synchronous status message, and performs frequency synchronization based on the selected frequency synchronization source.

Processes in which the second network device obtains the PTP information and the synchronous status message are respectively the same as the processes in the foregoing case 1 and case 2, and details are not described herein again.

According to the method provided in embodiments of this disclosure, the synchronization mode indication that can indicate the target network device to perform synchronization based on the synchronization information is included, and can indicate which network devices among network devices supporting FlexE to process synchronization information and a manner in which the network devices process the synchronization information, to implement automatic configuration of the network devices, simplify an operation process of configuring the network devices when network synchronization is required, and improve network synchronization efficiency. In addition, the synchronization mode indication included in the method provided in embodiments can indicate each hop node device among the network devices supporting FlexE to process the synchronization information, to improve synchronization precision of a network that carries data.

It should be noted that the FlexE synchronization mode in the foregoing network synchronization method may be a newly defined mode, or may be reused in an existing mode. For example, FlexE defines three modes: a FlexE-aware mode, a FlexE-unaware mode, and a FlexE-termination mode. The FlexE-aware mode is for reducing bandwidth occupied during FlexE service data transmission. The FlexE-unaware mode is for transmitting FlexE service data on an existing Ethernet device. The FlexE-termination mode is for splitting different FlexE service data. For example, a function of the FlexE synchronization mode in this embodiment is superimposed on the FlexE-aware mode, and the FlexE-aware mode is used as the FlexE synchronization mode, to further implement synchronization through superimposition while implementing an original function of the FlexE-aware mode.

Figure 6:
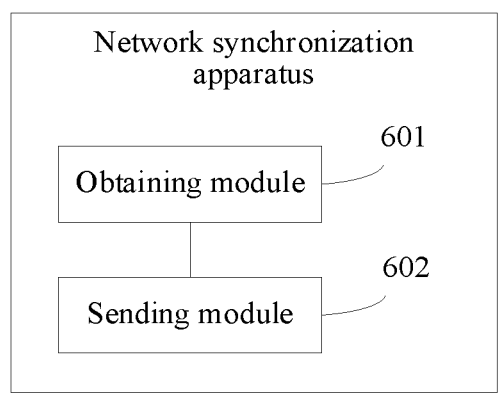
FIG. 6 is a schematic diagram of a structure of a network synchronization apparatus according to an embodiment of this disclosure.

An embodiment of this disclosure further provides a network synchronization apparatus. FIG. 6 is a schematic diagram of a structure of a network synchronization apparatus according to an embodiment of this disclosure. The apparatus is applied to a first network device that supports flexible Ethernet FlexE, and the first network device is the first network device shown in FIG. 5. Based on the following plurality of modules shown in FIG. 6, the network synchronization apparatus shown in FIG. 6 can perform all or some operations performed by the first network device. It should be understood that the apparatus may include more additional modules than the shown modules or omit some of the shown modules. This is not limited in this embodiment of this disclosure. As shown in FIG. 6, the apparatus includes:

an obtaining module 601, configured to obtain a synchronization mode indication and synchronization information, where the synchronization mode indication indicates a target network device to perform synchronization based on the synchronization information; and a sending module 602, configured to send the synchronization mode indication and the synchronization information through a network that supports FlexE.

In a possible implementation, the sending module 602 is configured to send a FlexE overhead frame through a network that supports FlexE, where the FlexE overhead frame includes the synchronization mode indication and the synchronization information.

In a possible implementation, the synchronization mode indication includes a first mode indication, and the first mode indication indicates the target network device to enter a FlexE synchronization mode.

In a possible implementation, the obtaining module 601 is further configured to obtain target network device indication information, where the target network device indication information indicates that an other-end device of a FlexE section or an other-end device of a FlexE path is the target network device.

In a possible implementation, the synchronization mode indication includes the target network device indication information.

In a possible implementation, the FlexE overhead frame includes at least one synchronization mode indication field, and the at least one synchronization mode indication field includes the synchronization mode indication; and the FlexE overhead frame includes a sixth FlexE overhead block, and the sixth FlexE overhead block includes the synchronization information.

In a possible implementation, a first synchronization mode indication field in the at least one synchronization mode indication field includes one or more bits, and the one or more bits include the synchronization mode indication; or the at least one synchronization mode indication field includes a second synchronization mode indication field, the second synchronization mode indication field includes at least one bit, and the at least one bit includes at least a part of the synchronization mode indication.

In a possible implementation, the apparatus further includes:
an encapsulation module, configured to encapsulate the synchronization information into an Ethernet frame, where the sixth FlexE overhead block includes the Ethernet frame.

In a possible implementation, the encapsulation module is further configured to: divide the Ethernet frame into N code blocks 1, 2, . . . , N−1, and N, and continuously insert a first code block to an $i^{th}$ code block in the N code blocks into bit fields of a sixth FlexE overhead block of a first FlexE overhead frame, where N is a positive integer greater than or equal to 2, i is a positive integer greater than or equal to 1, and i is less than N; and continuously insert an $(i+1)^{th}$ code block to a $j^{th}$ code block in the N code blocks into bit fields of a sixth FlexE overhead block of a second FlexE overhead frame, where the second FlexE overhead frame is a next FlexE overhead frame adjacent to the first FlexE overhead frame, j is a positive integer, and $i+1 \leq j \leq N$.

In a possible implementation, the synchronization information includes one or more of precision time protocol PIP information and a synchronous status message SSM, the PTP information indicates the target network device to perform time synchronization, and the synchronous status message indicates the target network device to perform frequency synchronization.

In a possible implementation, the first network device that supports flexible Ethernet FlexE includes a client edge device that supports FlexE or a node device in a network that supports FlexE, and the network that supports FlexE includes any one of a slicing packet network SPN, a metro transport network MTN, or an optical transport network OTN.

Figure 7:
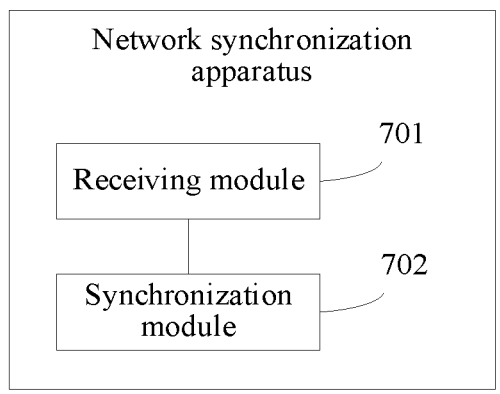
FIG. 7 is a schematic diagram of a structure of another network synchronization apparatus according to an embodiment of this disclosure.

FIG. 7 is a schematic diagram of a structure of a network synchronization apparatus according to an embodiment of this disclosure. The apparatus is applied to a second network device that supports flexible Ethernet FlexE, and the second network device is the second network device shown in FIG. 5. Based on the following plurality of modules shown in FIG. 7, the network synchronization apparatus shown in FIG. 7 can perform all or some operations performed by the second network device. It should be understood that the apparatus may include more additional modules than the shown modules or omit some of the shown modules. This is not limited in this embodiment of this disclosure. As shown in FIG. 7, the apparatus includes:
a receiving module 701, configured to receive a synchronization mode indication and synchronization information through a network that supports FlexE, where the synchronization mode indication indicates a target network device to perform synchronization based on the synchronization information; and
a synchronization module 702, configured to perform synchronization based on the synchronization mode indication and the synchronization information.

In a possible implementation, the synchronization mode indication includes a first mode indication, and the first mode indication indicates the target network device to enter a FlexE synchronization mode; and the synchronization module 702 is configured to enter the FlexE synchronization mode based on the first mode indication, and perform synchronization in the FlexE synchronization mode based on the synchronization information.

In a possible implementation, the receiving module 701 is further configured to receive target network device indication information, where the target network device indication information indicates that an other-end device of a FlexE section or an other-end device of a FlexE path is the target network device.

In a possible implementation, the synchronization mode indication includes the target network device indication information.

In a possible implementation, the receiving module 701 is configured to receive a FlexE overhead frame, where the FlexE overhead frame includes the synchronization mode indication and the synchronization information; and the apparatus further includes a parsing module, configured to parse the FlexE overhead frame, to obtain the synchronization mode indication and the synchronization information that are carried by the FlexE overhead frame.

In a possible implementation, the synchronization information includes one or more of precision time protocol PIP information and a synchronous status message SSM; if the synchronization information includes the PTP information, the synchronization module 702 is configured to select a time synchronization source based on the FTP information, and perform time synchronization based on the time synchronization source; or if the synchronization information includes the synchronous status message, the synchronization module 702 is configured to select a frequency synchronization source based on the synchronous status message, and perform frequency synchronization based on the frequency synchronization source.

In a possible implementation, the second network device that supports flexible Ethernet FlexE includes a client edge device that supports FlexE or a node device in a network that supports FlexE, and the network that supports FlexE includes any one of a slicing packet network SPN, a metro transport network MTN, or an optical transport network OTN.

It should be understood that, when the apparatus provided in FIG. 6 or FIG. 7 implements functions of the apparatus, division into the functional modules is merely used as an example for description. During actual disclosure, the foregoing functions may be allocated to different functional modules for implementation based on a requirement. In other words, an inner structure of a device is divided into different functional modules, to implement all or some of the functions described above. In addition, the apparatuses provided in the foregoing embodiments and the method embodiments pertain to a same concept. For a specific implementation process of the apparatuses, refer to the method embodiments. Details are not described herein again.

Figure 8:
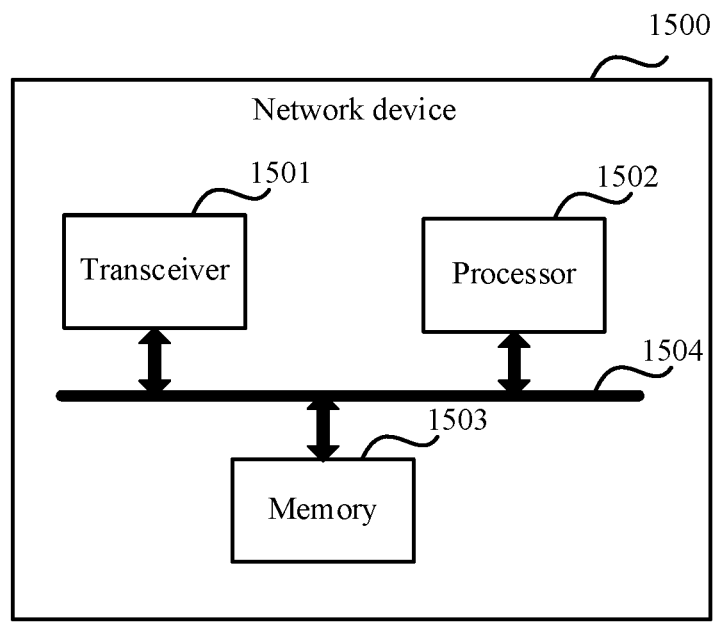
FIG. 8 is a schematic diagram of a structure of a network synchronization device according to an embodiment of this disclosure.

A hardware structure of the network device in the foregoing embodiment is shown in FIG. 8, in which a network device 1500 includes a transceiver 1501, a processor 1502, and a memory 1503. The transceiver 1501, the processor 1502, and the memory 1503 are connected by a bus 1504. The transceiver 1501 is configured to receive a synchronization mode indication and synchronization information and send the synchronization mode indication and the synchronization information. The memory 1503 is configured to store instructions or program code. The processor 1502 is configured to invoke the instructions or the program code in the memory 1503, so that the network device performs related processing steps of the first network device in the foregoing method embodiments. In a specific embodiment, the network device 1500 in this embodiment of this disclosure may correspond to the first network device in the foregoing method embodiments. The processor 1502 in the network device 1500 reads the instructions or the program code in the memory 1503, so that the network device 1500 shown in FIG. 8 can perform all or some operations performed by the first network device.

In a specific embodiment, the network device 1500 in this embodiment of this disclosure may correspond to the second network device in the foregoing method embodiments. The processor 1502 in the network device 1500 reads the instructions or the program code in the memory 1503, so that the network device 1500 shown in FIG. 8 can perform all or some operations performed by the second network device.

Figure 9:
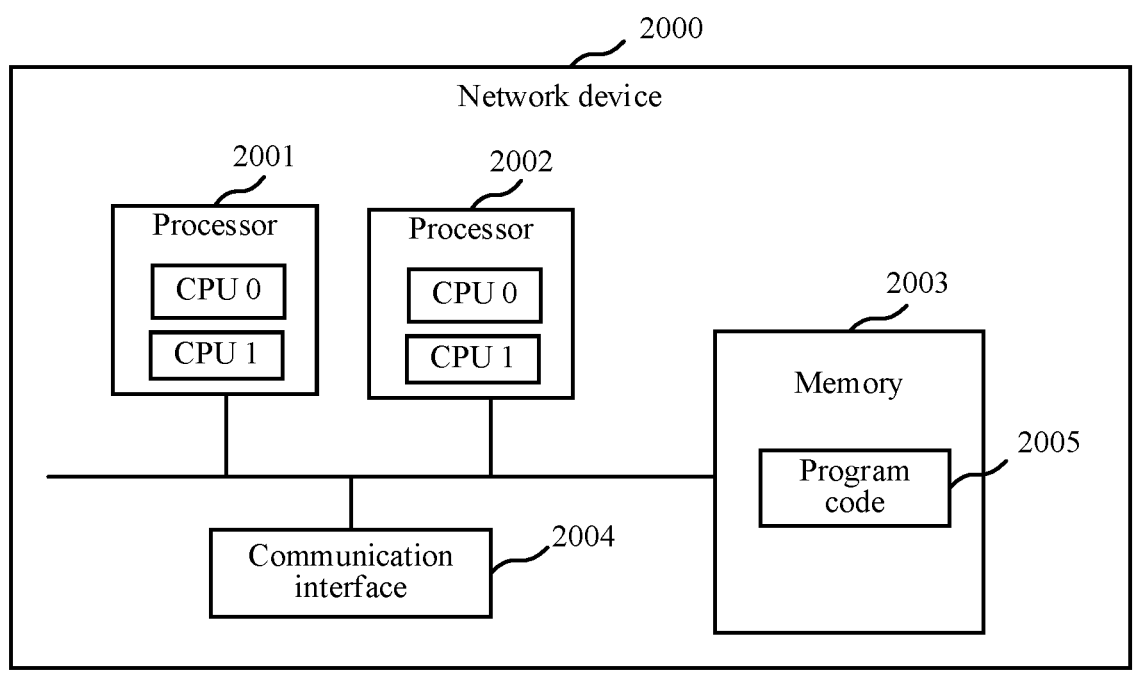
FIG. 9 is a schematic diagram of a structure of another network synchronization device according to an embodiment of this disclosure.

FIG. 9 is a schematic diagram of a structure of a network device 2000 according to an example embodiment of this disclosure. The network device 2000 shown in FIG. 9 is configured to perform operations related to the network synchronization method shown in FIG. 5. The network device 2000 is, for example, a switch or a router.

As shown in FIG. 9, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this disclosure. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field programmable gate array (FPGA), generic array logic (GAL), or any combination thereof. The processor 2001 may implement or execute various logical blocks, modules, and circuits described with reference to content disclosed in embodiments of the present invention. Alternatively, the processor may be a combination of processors implementing a computing function, for example, including a combination of one or more microprocessors, or a combination of a DSP and a microprocessor.

Optionally, the network device 2000 further includes a bus. The bus is configured to transmit information between components of the network device 2000. The bus may be a peripheral component interconnect (PCI) bus, an extended industry standard architecture (EISA) bus, or the like. Buses may be classified into an address bus, a data bus, a control bus, and the like. For ease of representation, only one thick line is used to represent the bus in FIG. 9, but this does not mean that there is only one bus or only one type of bus. In FIG. 9, in addition to being connected by a bus, components of the network device 2000 may be connected in another manner. The connection manner of the components is not limited in embodiments of the present invention.

The memory 2003 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by the bus. Alternatively, the memory 2003 may be integrated with the processor 2001.

The communication interface 2004 is configured to communicate with another device or a communication network by using any transceiver-type apparatus. The communication network may be the Ethernet, a radio access network (RAN), a wireless local area network (WLAN), or the like. The communication interface 2004 may include a wired communication interface, and may further include a wireless communication interface. Specifically, the communication interface 2004 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this disclosure, the communication interface 2004 may be used by the network device 2000 to communicate with another device.

In a specific implementation, in an embodiment, the processor 2001 may include one or more CPUs, such as a CPU 0 and a CPU 1 in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

In a specific implementation, in an embodiment, the network device 2000 may include a plurality of processors such as a processor 2001 and a processor 2002 shown in FIG. 9. Each of the processors may be a single-core processor (single-CPU) or a multi-core processor (multi-CPU). The processor herein may be one or more devices, circuits, and/or processing cores configured to process data (for example, computer program instructions).

During specific implementation, in an embodiment, the network device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, or a projector. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2005 for performing the solutions of this disclosure, and the processor 2001 may execute the program code 2005 stored in the memory 2003. In other words, the network device 2000 can implement, by using the processor 2001 and the program code 2005 in the memory 2003, the network synchronization method provided in the method embodiments. The program code 2005 may include one or more software modules. Optionally, the processor 2001 may also store program code or instructions for performing the solutions of this disclosure.

In a specific embodiment, the network device 2000 in this embodiment of this disclosure may correspond to the first network device in the foregoing method embodiments. The processor 2001 in the network device 2000 reads the program code 2005 in the memory 2003 or the program code or the instructions stored in the processor 2001, so that the network device 2000 shown in FIG. 9 can perform all or some operations performed by the first network device.

In a specific embodiment, the network device 2000 in this embodiment of this disclosure may correspond to the second network device in the foregoing method embodiments. The processor 2001 in the network device 2000 reads the program code 2005 in the memory 2003 or the program code or the instructions stored in the processor 2001, so that the network device 2000 shown in FIG. 9 can perform all or some operations performed by the second network device.

The network device 2000 may further correspond to the apparatus shown in FIG. 6 and FIG. 7. Each functional module in the apparatus shown in FIG. 6 and FIG. 7 is implemented by using software of the network device 2000. In other words, the functional modules included in the apparatus shown in FIG. 6 and FIG. 7 are generated after the processor 2001 of the network device 2000 reads the program code 2005 stored in the memory 2003.

The blocks of the network synchronization method shown in FIG. 5 are completed by using a hardware integrated logic circuit or instructions in the form of software in the processor of the network device 2000. The steps of the method disclosed with reference to embodiments of this disclosure may be directly performed by a hardware processor, or may be performed through a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

An embodiment of this disclosure further provides a network synchronization system. The system includes a first network device and a second network device. The first network device is configured to perform the method performed by the first network device in FIG. 5, and the second network device is configured to perform the method performed by the second network device in FIG. 5.

For respective functions of the first network device and the second network device in the system, refer to related descriptions shown in FIG. 5. Details are not described herein again.

It should be understood that the processor may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or any conventional processor or the like. It should be noted that the processor may be a processor that supports an advanced reduced instruction set computing machines (advanced RISC machines, ARM) architecture.

Further, in an optional embodiment, the memory may include a read-only memory and a random access memory, and provide instructions and data for the processor. The memory may further include a non-volatile random access memory. For example, the memory may further store information of a device type.

The memory may be a volatile memory or a non-volatile memory, or may include both a volatile memory and a non-volatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example, and not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A computer-readable storage medium is further provided. The storage medium stores at least one program instruction or code. When the program instruction or the code is loaded and executed by a processor, a computer is enabled to implement the network synchronization method shown in FIG. 5.

This disclosure provides a computer program. When the computer program is executed by a computer, a processor or the computer is enabled to perform corresponding steps and/or procedures in the foregoing method embodiments.

A chip is provided. The chip includes a processor, configured to: invoke, from a memory, instructions stored in the memory and run the instructions, so that a communication device on which the chip is installed performs the methods in the foregoing aspects.

Another chip is provided. The chip includes: an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

All or some of the foregoing embodiments may be implemented by using software, hardware, firmware, or any combination thereof. When software is used for implementation, all or some of embodiments may be implemented in a form of a computer program product. The computer program product includes one or more computer instructions. When the computer program instructions are loaded and executed on the computer, all or some of the procedures or functions according to this disclosure are generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, solid-state drive), or the like.

The objectives, technical solutions, and beneficial effects of this disclosure are further described in detail in the foregoing specific implementations. It should be understood that the foregoing descriptions are merely specific implementations of this disclosure, but are not intended to limit the protection scope of this disclosure. Any modification, equivalent replacement, or improvement made based on the technical solutions of this disclosure shall fall within the protection scope of this disclosure.

A person of ordinary skill in the art may be aware that, with reference to the method steps and the modules described in embodiments disclosed in this specification, implementation can be performed by using software, hardware, firmware, or a combination thereof. To clearly describe the interchangeability between the hardware and the software, the foregoing has generally described steps and composition of each embodiment based on functions. Whether the functions are performed by hardware or software depends on particular disclosures and design constraint conditions of the technical solutions. A person of ordinary skill in the art may use different methods to implement the described functions for each particular disclosure, but it should not be considered that the implementation goes beyond the scope of this disclosure.

A person of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

When software is used to implement embodiments, all or some of embodiments may be implemented in a form of a computer program product. The computer program product includes one or more computer program instructions. For example, the method in embodiments of this disclosure may be described in a context of machine-executable instructions. The machine-executable instructions are, for example, a program module executed in a device included in a real or virtual processor of a target. Usually, the program module includes a routine, a program, a library, an object, a class, a component, a data structure, and the like, and executes a specific task or implements a specific abstract data structure. In various embodiments, functions of program modules may be combined or split between the described program module. The machine-executable instructions used for the program module may be executed locally or within a distributed device. In the distributed device, the program module may be located in both a local storage medium and a remote storage medium.

Computer program code used to implement the methods in embodiments of this disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of embodiments of this disclosure, the computer program code or related data may be carried by any appropriate carrier, so that a device, an apparatus, or a processor can perform various processing and operations described above. Examples of the carrier include a signal, a computer-readable medium, and the like.

Examples of the signal may include propagating signals in electrical, optical, radio, sound, or other forms, such as a carrier and an infrared signal.

The computer-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

It may be clearly understood by a person skilled in the art that, for the purpose of convenient and brief description, for a detailed working process of the foregoing system, device, and module, refer to a corresponding process in the foregoing method embodiments. Details are not described herein.

In the several embodiments provided in this disclosure, it should be understood that the disclosed system, device, and method may be implemented in other manners. For example, the described device embodiment is merely an example. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this disclosure.

In addition, functional modules in embodiments of this disclosure may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium and includes several instructions for indicating a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory (read-only memory, ROM), a random access memory (random access memory, RAM), a magnetic disk, or an optical disc.

In this disclosure, terms such as "first" and "second" are used to distinguish same items or similar items that have basically same effects and functions. It should be understood that there is no logical or time sequence dependency between "first", "second", and "n$^{th}$". A quantity and an execution sequence are not limited. It should also be understood that although terms such as "first" and "second" are used in the following descriptions to describe various elements, these elements should not be limited by the terms. These terms are merely used to distinguish one element from another element. For example, without departing from the scope of various examples, a first network device may be referred to as a second network device. Similarly, a second network device may be referred to as a first network device. Both the first network device and the second network device may be network devices, and in some cases, may be separate and different network devices.

It should be further understood that sequence numbers of processes do not mean execution sequences in embodiments of this disclosure. The execution sequences of the processes should be determined based on functions and internal logic of the processes, and should not be construed as any limitation on the implementation processes of embodiments of this disclosure.

In this disclosure, the term "at least one" means one or more, and in this disclosure, the term "a plurality of" means two or more. For example, a plurality of second packets mean two or more second packets. Terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (the stated condition or event) is detected" or "in response to detecting (the stated condition or event)".

It should be understood that determining B based on A does not mean that B is determined based on only A, and B may alternatively be determined based on A and/or other information.

It should further be understood that "one embodiment", "an embodiment", or "a possible implementation" mentioned throughout this specification means that particular features, structures, or characteristics related to embodiments or implementations are included in at least one embodiment of this disclosure. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

What is claimed is:

1. A method, applied to a device that supports flexible Ethernet (FlexE), and the method comprising:
   obtaining a synchronization mode indication and synchronization information, wherein the synchronization mode indication comprises an identifier that identifies a target device that will perform synchronization based on the synchronization information, and indicates to the target device to perform synchronization based on the synchronization information; and
   sending the synchronization mode indication that includes the identifier and the synchronization information through a network that supports FlexE.

2. The method according to claim 1, wherein the synchronization mode indication and the synchronization information are carried in a FlexE overhead frame.

3. The method according to claim 2, wherein the synchronization mode indication comprises a first mode indication, and the first mode indication indicates to the target device to enter a FlexE synchronization mode.

4. The method according to claim 3, further comprising:
   obtaining, by the device, target device indication information, wherein the target device indication information indicates that an other-end device of a FlexE section or an other-end device of a FlexE path is the target device.

5. The method according to claim 4, wherein the identifier in the synchronization mode indication is the target device indication information.

6. The method according to claim 2, wherein the FlexE overhead frame comprises a first synchronization mode indication field, and the first synchronization mode indication field comprises at least part of the synchronization mode indication.

7. The method according to claim 6, wherein the FlexE overhead frame comprises a FlexE overhead block, and the FlexE overhead block comprises the first synchronization mode indication field that comprises the synchronization information.

8. The method according to claim 7, wherein that the FlexE overhead block comprises the synchronization information comprises:

encapsulating the synchronization information into an Ethernet frame, wherein the FlexE overhead block comprises the Ethernet frame.

9. The method according to claim 8, further comprising: dividing the Ethernet frame into N code blocks 1, 2, ..., N−1, and N, and continuously inserting a first code block to an $i^{th}$ code block in the N code blocks into bit fields of a sixth FlexE overhead block of a first FlexE overhead frame, wherein N is a positive integer greater than or equal to 2, i is a positive integer greater than or equal to 1, and i is less than N; and continuously inserting an $(i+1)^{th}$ code block to a $j^{th}$ code block in the N code blocks into bit fields of a sixth FlexE overhead block of a second FlexE overhead frame, wherein the second FlexE overhead frame is a next FlexE overhead frame adjacent to the first FlexE overhead frame, j is a positive integer, and $i+1 \leq j \leq N$.

10. The method according to claim 9, wherein the synchronization information comprises one or more of precision time protocol (PTP) information or a synchronous status message (SSM), the PTP information indicates to the target device to perform time synchronization, and the synchronous status message indicates to the target device to perform frequency synchronization.

11. The method according to claim 10, wherein the device comprises a client edge device that supports FlexE or a node device in a network that supports FlexE.

12. The method according to claim 11, wherein the network that supports FlexE comprises any one of a slicing packet network (SPN), a metro transport network (MTN), or an optical transport network (OTN).

13. A method, applied to a target device that supports flexible Ethernet (FlexE), the method comprising:

receiving a synchronization mode indication and synchronization information through a network that supports FlexE, wherein the synchronization mode indication comprises an identifier that identifies the target device that will perform synchronization based on the synchronization information, and indicates to the target device to perform synchronization based on the synchronization information; and performing synchronization based on the synchronization mode indication and the synchronization information.

14. The method according to claim 13, wherein the synchronization mode indication comprises a first mode indication, and the first mode indication indicates to the target device to enter a FlexE synchronization mode; and wherein performing, by the device, synchronization based on the synchronization mode indication and the synchronization information comprises:

entering, by the device, the FlexE synchronization mode based on the first mode indication, and performing, by the device, synchronization in the FlexE synchronization mode based on the synchronization information.

15. The method according to claim 14, further comprising:

receiving target device indication information, wherein the target device indication information indicates that an other-end device of a FlexE section or an other-end device of a FlexE path is the target device.

16. The method according to claim 15, wherein the identifier in the synchronization mode indication is the target device indication information.

17. The method according to claim 16, wherein receiving the synchronization mode indication and the synchronization information comprises:

receiving a FlexE overhead frame, wherein the FlexE overhead frame comprises the synchronization mode indication and the synchronization information; and wherein before performing synchronization based on the synchronization mode indication and the synchronization information, the method further comprises:

obtaining the synchronization mode indication and the synchronization information based on the FlexE overhead frame.

18. The method according to claim 17, wherein the synchronization information comprises one or more of precision time protocol (PTP) information or a synchronous status message (SSM); and wherein performing synchronization based on the synchronization information comprises:

when the synchronization information comprises the PTP information, selecting, by the device, a time synchronization source based on the PTP information, and performing, by the device, time synchronization based on the time synchronization source; or when the synchronization information comprises the synchronous status message, selecting, by the device, a frequency synchronization source based on the synchronous status message, and performing, by the device, frequency synchronization based on the frequency synchronization source.

19. The method according to claim 18, wherein the device comprises a client edge device that supports FlexE or a node device in a network that supports FlexE.

20. The method according to claim 19, wherein the network comprises any one of a slicing packet network (SPN), a metro transport network (MTN), or an optical transport network (OTN).

21. An apparatus, wherein the apparatus is applied to a device that supports flexible Ethernet (FlexE), and the apparatus comprises at least one processor, the at least one processor is configured to execute at least one program instruction or code, to cause the device to:

obtain a synchronization mode indication and synchronization information, wherein the synchronization mode indication comprises an identifier that identifies a target device that will perform synchronization based on the synchronization information, and indicates to the target device to perform synchronization based on the synchronization information; and send the synchronization mode indication that includes the identifier and the synchronization information through a network that supports FlexE.

22. The apparatus according to claim 21, wherein the at least one processor is further configured to execute the at least one program instruction or code, to cause the device to send a FlexE overhead frame through a network that supports FlexE, wherein the FlexE overhead frame comprises the synchronization mode indication and the synchronization information.

23. The apparatus according to claim 22, wherein the synchronization mode indication comprises a first mode indication, and the first mode indication indicates to the target device to enter a FlexE synchronization mode.

24. The apparatus according to claim 23, wherein the at least one processor is further configured to execute the at least one program instruction or code, to cause the device to obtain target device indication information, wherein the target device indication information indicates that an other-end device of a FlexE section or an other-end device of a FlexE path is the target device.

25. The apparatus according to claim 24, wherein the identifier in the synchronization mode indication is the target device indication information.

26. The apparatus according to claim 22, wherein the FlexE overhead frame comprises at least one synchronization mode indication field, and the at least one synchronization mode indication field comprises the synchronization mode indication; and wherein the FlexE overhead frame comprises a FlexE overhead block, and the FlexE overhead block comprises the synchronization information.

27. The apparatus according to claim 26, wherein a first synchronization mode indication field in the at least one synchronization mode indication field comprises one or more bits, and the one or more bits comprise the synchronization mode indication; or wherein the at least one synchronization mode indication field comprises a second synchronization mode indication field, the second synchronization mode indication field comprises at least one bit, and the at least one bit comprises at least a part of the synchronization mode indication.

28. The apparatus according to claim 27, wherein the processor is further configured to execute the at least one program instruction or code, to further cause the device to:

encapsulate the synchronization information into an Ethernet frame, wherein the FlexE overhead block comprises the Ethernet frame.

29. The apparatus according to claim 28, wherein the processor is further configured to execute the at least one program instruction or code, to further cause the device to:

divide the Ethernet frame into N code blocks 1, 2, ..., N−1, and N, and continuously insert a first code block to an $i^{th}$ code block in the N code blocks into bit fields of a sixth FlexE overhead block of a first FlexE overhead frame, wherein N is a positive integer greater than or equal to 2, i is a positive integer greater than or equal to 1, and i is less than N; and continuously insert an $(i+1)^{th}$ code block to a $j^{th}$ code block in the N code blocks into bit fields of a sixth FlexE overhead block of a second FlexE overhead frame, wherein the second FlexE overhead frame is a next FlexE overhead frame adjacent to the first FlexE overhead frame, j is a positive integer, and $i+1 \leq j \leq N$.

30. The apparatus according to claim 29, wherein the synchronization information comprises one or more of precision time protocol (PTP) information or a synchronous status message (SSM), the PTP information indicates to the target device to perform time synchronization, and the synchronous status message indicates to the target device to perform frequency synchronization.

* * * * *